United States Patent
Mortenson et al.

(10) Patent No.: US 12,005,956 B2
(45) Date of Patent: Jun. 11, 2024

(54) BODY TIE-DOWN

(71) Applicant: Oshkosh Corporation, Oshkosh, WI (US)

(72) Inventors: Matthew Mortenson, Oshkosh, WI (US); Varun Kandasamy, Oshkosh, WI (US); Kirby Sorensen, Oshkosh, WI (US); Clinton Weckwerth, Pine Island, MN (US); Zachary L. Klein, Rochester, MN (US); Jerrod Kappers, Oshkosh, WI (US); Nicholas Malm, Oshkosh, WI (US); Jerry Shirley, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/520,022

(22) Filed: Nov. 5, 2021

(65) Prior Publication Data

US 2022/0161854 A1 May 26, 2022

Related U.S. Application Data

(60) Provisional application No. 63/117,753, filed on Nov. 24, 2020.

(51) Int. Cl.
*B62D 21/11* (2006.01)
*B62D 21/09* (2006.01)
*B62D 27/04* (2006.01)

(52) U.S. Cl.
CPC .............. *B62D 21/11* (2013.01); *B62D 21/09* (2013.01); *B62D 27/04* (2013.01)

(58) Field of Classification Search
CPC ......... B62D 21/11; B62D 21/09; B62D 27/04
See application file for complete search history.

(56) References Cited

U.S. PATENT DOCUMENTS

| | | | | |
|---|---|---|---|---|
| 4,862,983 | A | * | 9/1989 | Kreft ...................... B62D 27/04 180/89.13 |
| 7,503,553 | B2 | * | 3/2009 | Brannan ................... F16F 1/12 267/248 |
| 8,246,021 | B2 | * | 8/2012 | Shand .................. B60G 99/002 267/141.1 |
| 10,145,441 | B2 | * | 12/2018 | Zhu ....................... F16F 13/002 |
| 2019/0077461 | A1 | * | 3/2019 | Lackore, Jr. ........... B62D 21/11 |

FOREIGN PATENT DOCUMENTS

GB 2553328 A * 3/2018 ............. B62D 21/02

* cited by examiner

*Primary Examiner* — Jason D Shanske
*Assistant Examiner* — Matthew James O'Neill
(74) *Attorney, Agent, or Firm* — Foley & Lardner LLP

(57) ABSTRACT

A body tie-down for a chassis includes a mounting plate, a spring assembly, and a rigid member. The mounting plate is configured to fixedly couple with a body frame member with one or more fasteners, each of the fasteners including a bolt and a collar that are swaged together. The rigid member is configured to couple with the mounting plate through the spring assembly to provide a semi-resilient joint between the rigid member and the mounting plate, the rigid member configured to fixedly couple with a frame.

20 Claims, 12 Drawing Sheets

BODY TIE-DOWN

CROSS-RELATED TO RELATED PATENT APPLICATION

This application claims the benefit of and priority to U.S. Provisional Patent Application No. 63/117,753, filed Nov. 24, 2020, the disclosure of which is incorporated herein by reference in its entirety.

BACKGROUND

The present disclosure relates to chassis for commercial vehicles. More particularly, the present disclosure relates to securing a body of a commercial vehicle with a chassis of the commercial vehicle.

SUMMARY

One embodiment of the present disclosure is a body tie-down for a chassis. The body tie-down includes a mounting plate, a spring assembly, and a rigid member. The mounting plate is configured to fixedly couple with a body frame member with one or more fasteners, each of the fasteners including a bolt and a collar that are swaged together. The rigid member is configured to couple with the mounting plate through the spring assembly to provide a semi-resilient joint between the rigid member and the mounting plate, the rigid member configured to fixedly couple with a frame.

Another embodiment of the present disclosure is a vehicle including a body, a chassis, and multiple body couplers. The chassis is configured to couple with the body. A first one of the multiple body couplers includes a mounting plate, a spring assembly, and a rigid member. The mounting plate is configured to fixedly couple with the body through one or more fasteners, each of the fasteners including a bolt and a collar that are swaged together. The rigid member is configured to couple with the mounting plate through the spring assembly to provide a semi-resilient joint between the rigid member and the mounting plate. The rigid member is configured to fixedly couple with the chassis.

Another embodiment of the present disclosure is a chassis assembly for a refuse vehicle. The chassis assembly includes a frame member, a body, and a coupler configured to secure the frame member with the body. The coupler includes a mounting plate, a spring assembly, and a rigid member. The mounting plate is configured to fixedly couple with the body through one or more fasteners. Each of the fasteners includes a bolt and a collar that are swaged together. The rigid member is configured to couple with the mounting plate through the spring assembly to provide a semi-resilient joint between the rigid member and the mounting plate. The rigid member is configured to fixedly couple with the frame member.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
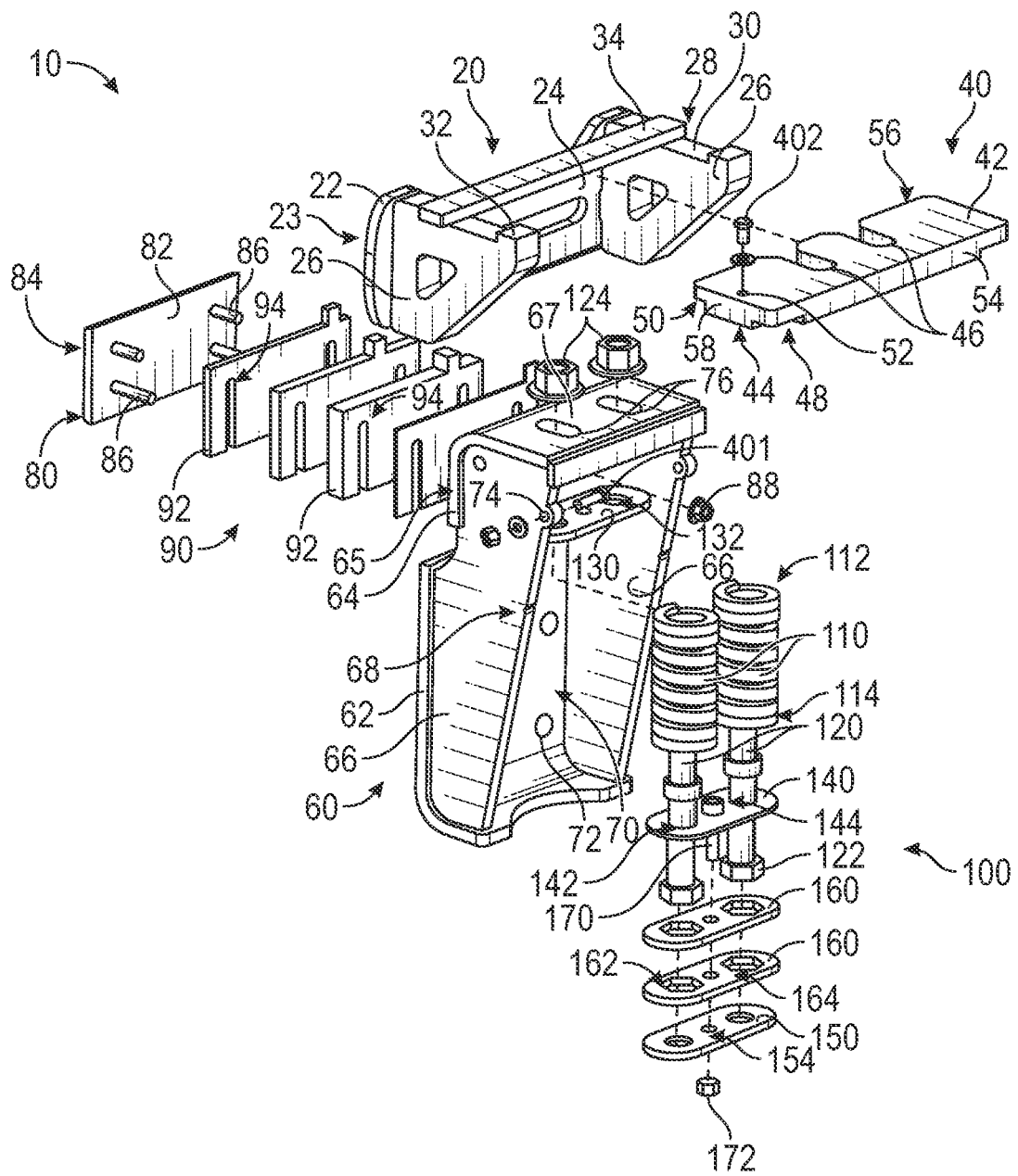
FIG. 1 is an exploded perspective view of a body tie-down, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

According to an exemplary embodiment, a body tie-down is used to non-rigidly attach a body to a chassis of a vehicle. Body tie-downs may be designed for a specific body and chassis combination and installation location along the longitudinal length of the body and chassis. The body tie-down of the present disclosure allows for body and chassis variability. The variability in the body may include body type, body width, and the position of a portion of the body tie-down along the longitudinal length of the body. The variability in the chassis may include chassis type, chassis width, and the position of a portion of the body tie-down along the longitudinal length of the chassis. The body tie-down facilitates the non-rigid coupling of multiple different bodies to multiple different chassis. The body tie-down also improves the serviceability of a vehicle that has the body tie-down installed. In one embodiment, the serviceability is improved because there are no loose components (e.g., screws, bolts, nuts, springs, etc.), which may otherwise be lost as the body is detached from the chassis of the vehicle. The body tie-down reduces the risk of over-compressing and under-compressing a spring assembly of the body tie-down during installation, repair, and/or maintenance on the vehicle.

According to the exemplary embodiment shown in FIGS. 1-8, a body tie-down, shown as a body tie-down 10, non-rigidly couples a portion of a body, shown as body frame member 200, to a chassis, shown as frame 300, of a vehicle (e.g., a refuse vehicle, etc.). The non-rigid coupling facilitates independent movement of the body of the vehicle relative to the frame 300. The body of the vehicle may thereby flex or move as the vehicle with which the frame 300 is associated encounters various obstacles (e.g., speed bumps, pot holes, curves, etc.). Facilitating such relative movement reduces the risk of damage to the body, the body frame member 200, and the frame 300. As shown in FIGS. 1-4, the body tie-down includes an upper guide, shown as body guide 20; a lower guide, shown as frame guide 60; a retainer, shown as retainer plate 40; a wear member, shown as wear plate 80; one or more shims forming a shim pack, shown as shim pack 90, and a spring assembly, shown as spring assembly 100.

Figure 2:
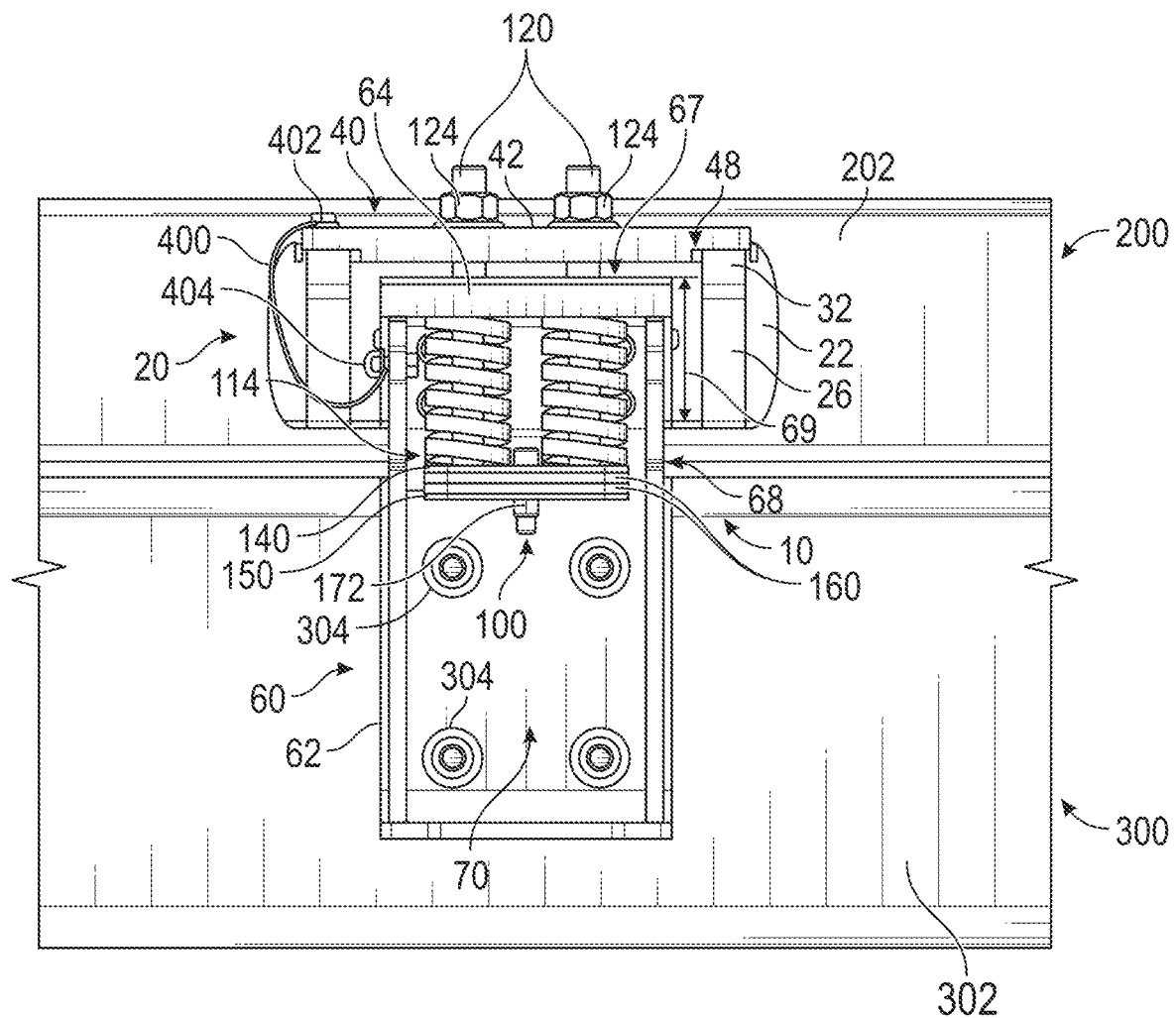
FIG. 2 is a front view of the body tie-down of FIG. 1, according to an exemplary embodiment.
Figure 3:
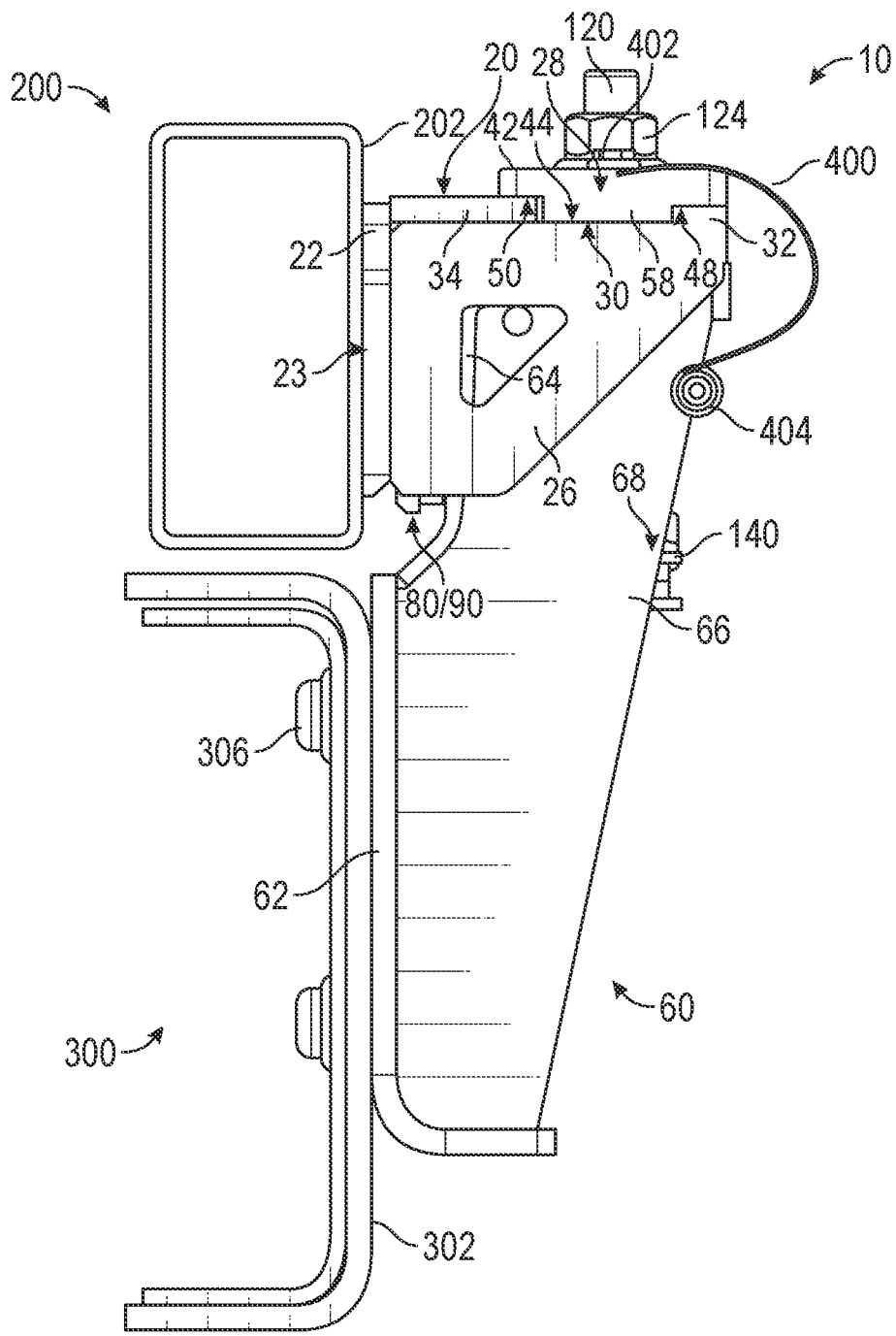
FIG. 3 is a side view of the body tie-down of FIG. 1, according to an exemplary embodiment.
Figure 4:
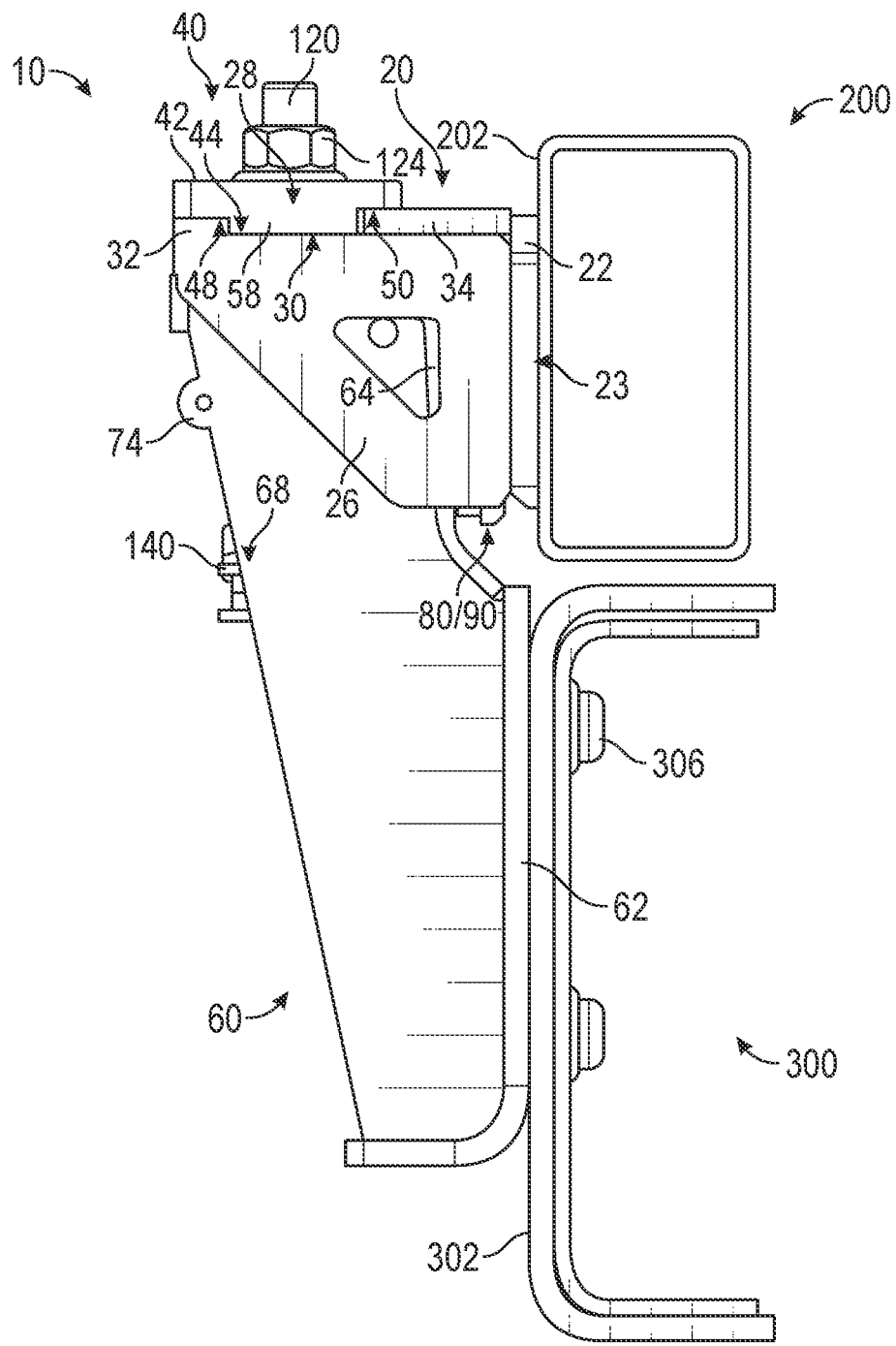
FIG. 4 is a side view of the body tie-down of FIG. 1, according to an exemplary embodiment.

As shown in FIG. 1, the body guide 20 includes a mounting portion, shown as body mounting portion 22. The body mounting portion 22 include a first surface, shown as body mounting surface 23, and an opposing second surface, shown as frame guide mounting surface 24. As shown in FIGS. 2-4, the body mounting surface 23 of the body mounting portion 22 is coupled to a mounting surface, shown as body mounting surface 202, of the body frame member 200. The body mounting surface 23 may be shaped or otherwise configured to be coupled to the body mounting surface 202. In one embodiment, the body mounting portion 22 is welded to the body mounting surface 202. In other embodiments, the body mounting portion 22 is otherwise coupled to the body mounting surface 202 (e.g., bolted, etc.). As shown in FIG. 1, the body guide 20 includes a pair of arms, shown as brackets 26, that extend from a plate defining the frame guide mounting surface 24 of the body mounting portion 22. As shown in FIG. 2, the brackets 26 are spaced apart such that the body guide 20 selectively receives the frame guide 60. As shown in FIG. 1, the brackets 26 each define a cavity, shown as slot 28. The slot 28 is defined by and extends between a first extension, shown as front extension 32, and a second extension, shown as rear extension 34. According to the exemplary embodiment shown in FIG. 1, each of the brackets 26 include a front extension 32, while the rear extension 34 is defined by a plate that extends between the brackets 26. As shown in FIGS. 1 and 3-4, the slot 28 is also defined by the mounting surface 30 of each bracket 26.

As shown in FIG. 1, the retainer plate 40 has a first surface, shown as top surface 42, an opposing second surface, shown as mounting surface 44, a first edge, shown as front edge 54, and a second edge, shown as rear edge 56. As shown in FIG. 1, the retainer plate 40 defines a pair of slots, shown as slots 46. In one embodiment, the slots 46 are configured to receive fasteners to removably couple the retainer plate 40 to the body guide 20. In other embodiments, the number of slots 46 varies (e.g., one, three, etc.) to correspond with the number of fasteners of the spring assembly 100. As shown in FIG. 1, the retainer plate 40 defines a pair of cutouts, shown as front notches 48. The front notches 48 are positioned at the corners of the front edge 54 and along the mounting surface 44, according to the exemplary embodiment shown in FIG. 1. The retainer plate 40 also defines a cutout, shown as rear notch 50. According to an exemplary embodiment, the rear notch 50 extends the entire length of the rear edge 56 of the retainer plate 40 and along the mounting surface 44. The retainer plate 40 has an extension 58 positioned between the front notches 48 and the rear notch 50. As shown in FIGS. 2-4, the slots 28 are configured to receive the extension 58 such that the mounting surface 44 of the retainer plate 40 abuts the mounting surfaces 30 of the brackets 26, coupling the retainer plate 40 to the body guide 20. When the retainer plate 40 is coupled to the body guide 20, the front notches 48 of the retainer plate 40 receive the front extensions 32 of the body guide 20 and the rear notch 50 of the retainer plate 40 receives the rear extension 34 of the body guide 20. According to an exemplary embodiment, the extension 58, the front notches 48, and the rear notch 50 of the retainer plate 40 are positioned to correspond with the slot 28, the front extensions 32, and the rear extension 34 of the body guide 20. Interaction between the extension 58 and the front extensions 32 and the rear extension 34 may prevent lateral and longitudinal movement of the retainer plate 40 (e.g., away from the body frame member 200, etc.) when the retainer plate 40 is coupled to the body guide 20.

As shown in FIG. 1, the frame guide 60 includes a lower mounting portion, shown as frame mounting portion 62, an upper mounting portion, shown as body guide mounting portion 64, and walls, shown as side walls 66. As shown in FIGS. 1-2, the frame guide 60 defines a cavity, shown as cavity 70. As shown in FIG. 2, the cavity 70 is configured to receive the spring assembly 100. The frame mounting portion 62 couples to a mounting surface, shown as frame mounting surface 302, of the frame 300. The frame mounting portion 62 may be shaped or otherwise configured to be coupled to the frame mounting surface 302. As shown in FIG. 1, the frame mounting portion 62 defines a plurality of apertures, shown as apertures 72. The frame mounting surface 302 may define a plurality of apertures that correspond with the apertures 72 of the frame mounting portion 62. As shown in FIGS. 2-4, a plurality of fasteners, shown as bolts 306, extend through the apertures 72 of the frame mounting portion 62 and the apertures of the frame 300. The frame mounting portion 62 may be secured to the frame 300 with additional, corresponding fasteners, shown as nuts 304. In an alternative embodiment, the frame mounting portion 62 is welded or otherwise coupled to the frame mounting surface 302.

The body guide mounting portion 64 of the frame guide 60 slidably engages the frame guide mounting surface 24 of the body guide 20. According to an exemplary embodiment, the slidable engagement between the body guide mounting portion 64 and the frame guide mounting surface 24 facilitates a non-rigid coupling between the body guide 20 (i.e., the body frame member 200, etc.) and the frame guide 60 (i.e., the frame 300, etc.). According to the exemplary embodiment shown in FIGS. 1 and 3-4, the body tie-down 10 includes wear plate 80 disposed between the frame guide mounting surface 24 of the body guide 20 and the body guide mounting portion 64 of the frame guide 60. In some embodiments, the body tie-down 10 includes shim pack 90 disposed between the wear plate 80 and the body guide mounting portion 64 of the frame guide 60. The wear plate 80 substantially prevents wear between the body guide 20 and the frame guide 60 during operation of the vehicle. The wear plate 80 may be replaced (e.g., as it wears due to movement of the body guide 20 relative to the frame guide 60, as the body frame member 200 moves relative to the frame 300, etc.). As shown in FIG. 1, the shim pack 90 includes a plurality of spacers, shown as shims 92. The shim pack 90 may include one or more shims 92 (e.g., zero, one, two, five, etc.) based on features (e.g., width, etc.) of the body frame member 200 and the frame 300 the body tie-down 10 couples. The shim pack 90 is selectively reconfigurable to facilitate the coupling of differently-sized (e.g., width, etc.) bodies to differently-sized frames 300 (e.g., by adding or removing shims 92 from the shim pack 90, etc.). In some embodiments, the shim pack 90 is omitted (e.g., the body frame member 200 and the frame 300 have substantially identical widths, the body frame member 200 and the frame 300 have a fixed width differential, etc.).

As shown in FIG. 1, the wear plate includes a first surface, shown as front surface 82, an opposing second surface, shown as rear surface 84, and a plurality of fasteners, shown as threaded rods 86, extending from the front surface 82. In embodiments where the body tie-down 10 includes the shim pack 90, the threaded rods 86 extend through slots, shown as shim slots 94, defined by the shims 92. The shims 92 may be stacked in series along the length of the threaded rods 86. The front surface 82 of the wear plate 80 abuts (e.g., if the shim pack 90 is omitted, etc.) or is spaced a distance from a rear surface, shown as rear surface 65, of the body guide mounting portion 64. The spacing between the wear plate 80 and the body guide mounting portion 64 is based on the number and thickness of shims 92 within the shim pack 90 (e.g., increasing the number of shims increases the distance, etc.). The threaded rods 86 are positioned to correspond with a plurality of apertures defined by the body guide mounting portion 64. According to an example embodiment, the threaded rods 86 of the wear plate 80 extend through the corresponding apertures of the body guide mounting portion 64 and are received by fasteners, shown as nuts 88. The threaded rods 86 and the nuts 88 releasably couple at least one of the wear plate 80 and the shim pack 90 to the body guide mounting portion 64 of the frame guide 60. According to an exemplary embodiment, the rear surface 84 of the wear plate 80 slidably engages the frame guide mounting surface 24 when the body tie-down 10 is assembled (e.g., the body guide 20 is coupled to the frame guide 60, etc.). The slidable engagement between the wear plate 80 and the frame guide mounting surface 24 facilitates the non-rigid coupling between the body guide 20 (i.e., the body frame member 200, etc.) and the frame guide 60 (i.e., the frame 300, etc.).

As shown in FIG. 1, the body guide mounting portion 64 of the frame guide 60 defines a pair of apertures, shown as slotted apertures 76. The slotted apertures 76 extend through a top surface, shown as top surface 67, of the body guide mounting portion 64. The slotted apertures 76 are configured to receive fasteners of the spring assembly 100 to removably couple the frame guide 60 to the body guide 20. In other embodiments, the number of slotted apertures 76 varies (e.g., one, three, etc.) to correspond with a different number of fasteners of the spring assembly 100. As shown in FIG. 1-4, the side walls 66 define a visual indicator, shown as notch 68, positioned a distance 69 from the top surface 67 of the body guide mounting portion 64. The distance 69 may be measured from another surface, according to other embodiments. According to an exemplary embodiment, the notch 68 provides a visual indication to reduce the risk that an operator (e.g., installer, mechanic, etc.) will over-compress or under-compress the spring assembly 100.

As shown in FIG. 1, the retainer plate 40 further defines an aperture, shown as lanyard aperture 52, and the side walls 66 of the frame guide 60 define an aperture, shown as lanyard aperture 74. As shown in FIGS. 1-3, the lanyard aperture 52 of the retainer plate 40 is configured to receive a fastener 402 and the lanyard aperture 74 is configured to receive a fastener 404. The fastener 402 and the fastener 404 couple a lanyard, shown as tether 400, to the retainer plate 40 and the frame guide 60, respectively. The tether 400 is configured to couple the retainer plate 40 to the frame guide 60. The retainer plate 40 is therefore not a loose component even when the retainer plate 40 is decoupled from the body guide 20 (e.g., the retainer plate 40 remains coupled to the frame guide 60 of the body tie-down 10, thereby preventing the retainer plate 40 from being misplaced, etc.).

As shown in FIGS. 1-2, the spring assembly 100 includes a set of springs, shown as springs 110. In some embodiments, the spring assembly 100 includes a different number of springs (e.g., one, three, etc.). As shown in FIGS. 1-2, the spring assembly 100 includes a set of fasteners, shown as spring bolts 120 (e.g., collar bolts, etc.). As shown in FIGS. 1-2, the springs 110 are configured to receive the spring bolts 120 through a center aperture defined by the springs 110. According to an exemplary embodiment, the number of spring bolts 120 corresponds with the number of springs 110 within the spring assembly 100. The spring bolts 120 may include an integrally formed collar or receive separate collar components. As shown in FIGS. 1-2, the spring assembly 100 includes a plate set. The plate set includes a first plate, shown as upper spring plate 130; a second plate, shown as middle spring plate 140; and a bottom plate, shown as bottom spring plate 150.

As shown in FIGS. 1-2, the spring assembly 100 includes a pair of intermediate plates, shown as bolt capture plates 160. The bolt capture plates 160 are positioned between the middle spring plate 140 and the bottom spring plate 150. In some embodiments, the spring assembly 100 includes a different number of bolt capture plates (e.g., one, three, based on the height of a head of the spring bolts 120, etc.). As shown in FIG. 1, the bolt capture plates 160 include apertures, shown as bolt head apertures 162. According to an exemplary embodiment, the bolt head apertures 162 correspond with the shape and size of a bolt head, shown as bolt head 122, of the spring bolts 120. According to an exemplary embodiment, the bolt head apertures 162 are configured to receive the bolt heads 122 of the spring bolts 120 to prevent the spring bolts 120 from spinning during tightening or loosening.

As shown in FIG. 1, the upper spring plate 130 defines apertures, shown as apertures 132. According to an exemplary embodiment, the apertures 132 are configured to receive the spring bolts 120. In one embodiment, the apertures 132 are spaced apart to position the spring bolts 120 such that an upper end 112 of the springs 110 do not contact each other. As shown in FIG. 1, the middle spring plate 140 includes apertures, shown as apertures 142. According to an exemplary embodiment, the apertures 142 are configured to receive the spring bolts 120. In one embodiment, the apertures 142 are spaced apart to position the spring bolts 120 such that a lower end 114 of the springs 110 do not contact each other. By way of example, the upper end 112 of the springs 110 contact the upper spring plate 130. As shown in FIG. 2, the lower end 114 of the springs 110 contact the middle spring plate 140 such that the springs 110 are disposed between the upper spring plate 130 and the middle spring plate 140. Collars associated with the spring bolts 120 may also help position the springs 110.

As shown in FIG. 1, the middle spring plate 140, the bolt capture plates 160, and the bottom spring plate 150 each define an aperture, shown as center aperture 144, center aperture 164, and center aperture 154, respectively. As shown in FIGS. 1-2, the center apertures 144, 154, and 164 are configured to receive a fastener, shown as bolt 170 and nut 172. The bolt 170 and nut 172 are configured to couple the middle spring plate 140, the bolt capture plates 160, and the bottom spring plate 150 together. This arrangement positions each bolt head 122 of the spring bolts 120 within the bolt head apertures 162 between the middle spring plate 140 and the bottom spring plate 150, thereby rotationally and longitudinally locking the spring bolts 120 in place.

As shown in FIGS. 1-4, the spring bolts 120 extend through the slotted apertures 76 of the body guide mounting portion 64 and the slots 46 of the retainer plate 40. A corresponding number of nuts, shown as hex nuts 124, cooperate with the spring bolts 120 and position the spring assembly 100 of the body tie-down 10 within the cavity 70 of the frame guide 60 and thereby couple the body guide 20 with the frame guide 60. As shown in FIGS. 2-4, the hex nuts 124 are disposed along the top surface 42 of the retainer plate 40. The springs 110 may be compressed or decompressed by tightening or loosening only the hex nuts 124 as the spring bolts 120 are rotationally fixed by the bolt capture plates 160 (i.e., only one tool is needed rather than one to hold the spring bolts 120 rotationally fixed and a second to tighten the hex nuts 124, etc.). According to an exemplary embodiment, the springs 110 of the spring assembly 100 compress between the upper spring plate 130 and the middle spring plate 140 as the hex nuts 124 are tightened. An operator may pretension the springs 110 to a target spring force using the notch 68 as a visual indication that the springs 110 are pre-tensioned to the target spring force. As shown in FIG. 2, the hex nuts 124 are tightened such that the middle spring plate 140 aligns with the notch 68, thereby spacing the middle spring plate 140 the distance l from the top surface 67 of the body guide mounting portion 64. According to an exemplary embodiment, positioning the middle spring plate 140 at the notch 68 pretensions the springs 110 to the target spring force (i.e., the distance l and the spring rate of the springs 110 produce the target spring force, etc.). By aligning the middle spring plate 140 with the notch 68, the risk that an operator may over-compress (e.g., too high of a spring force, etc.) or under-compress (e.g., too low of a spring force, etc.) the springs 110 by over-tightening or under-tightening the hex nuts 124 is reduced. According to an exemplary embodiment, the spring assembly 100 allows for controlled movement of the body frame member 200 relative to the frame 300 (e.g., by compressing and decompressing when the vehicle encounters obstacles such as bumps, pot holes, curves, etc.). The amount and/or nature of permitted movement is related to the spring force.

Figure 5:
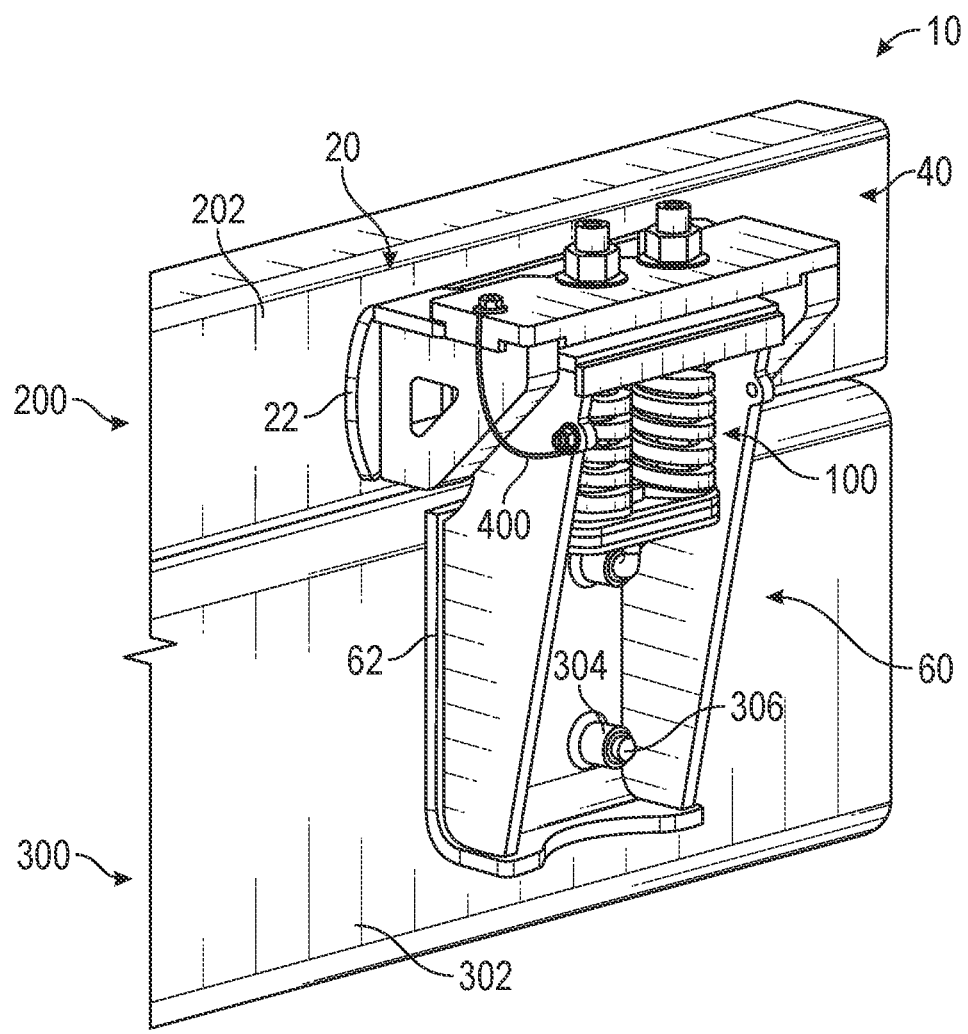
FIG. 5 is a perspective view of the body tie-down of FIG. 1, according to an exemplary embodiment.
Figure 6:
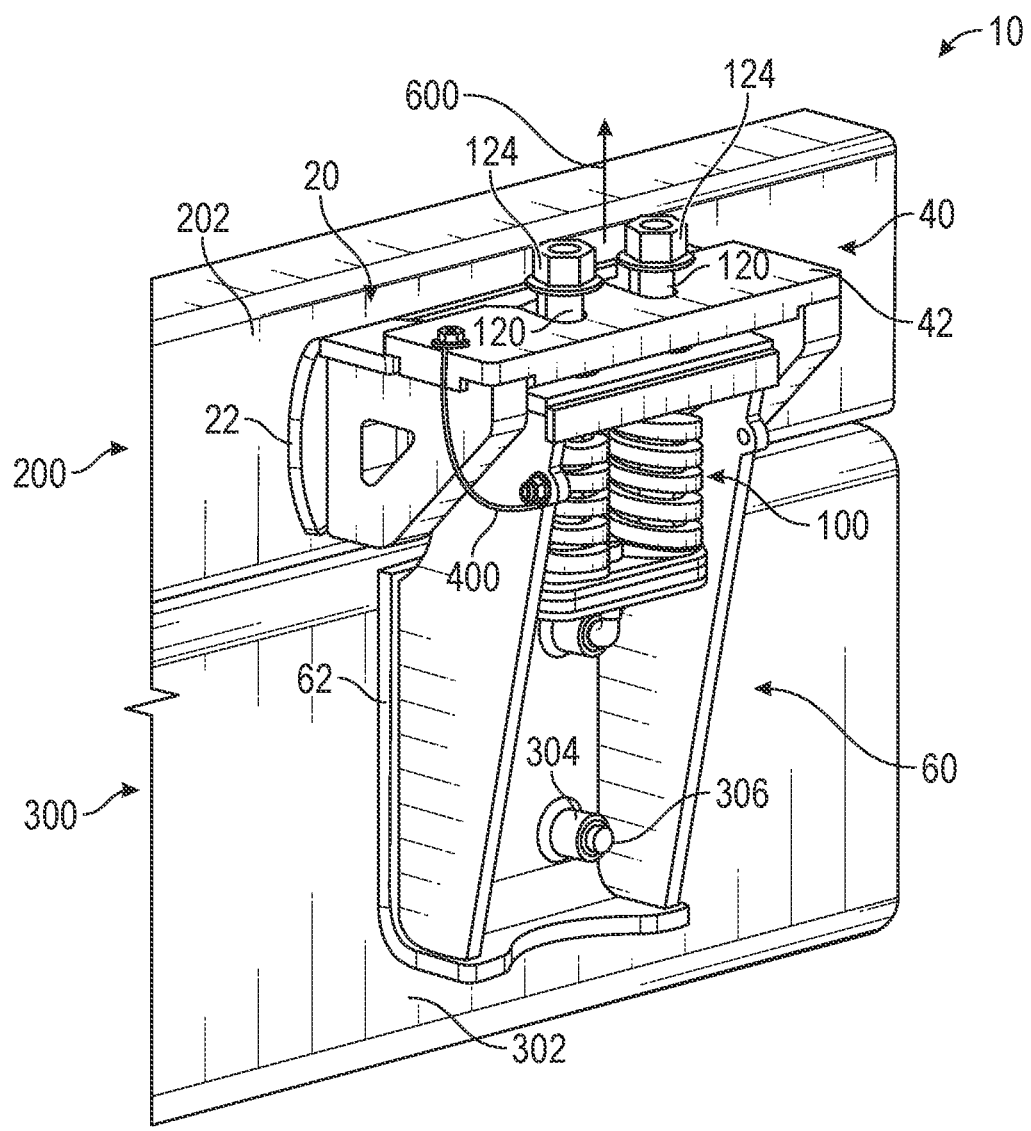
FIG. 6 is a perspective view of the body tie-down of FIG. 1, according to an exemplary embodiment.

According to the exemplary embodiments shown in FIGS. 5-8, the body frame member 200 and the frame 300 of the vehicle are selectively coupled by the body tie-down 10. According to an exemplary embodiment, all of the components of the body tie-down 10 remain coupled to one of the body frame member 200, the frame 300, and another component of the body tie-down 10 when the body frame member 200 is decoupled from the frame 300. As shown in FIG. 5, the body tie-down 10 is configured in a coupled arrangement such that the body frame member 200 and the frame 300 are non-rigidly coupled to each other. As shown in FIG. 6, the hex nuts 124 fastened to the spring bolts 120 are loosened (e.g., but do not need to be removed, etc.) to allow the springs 110 to decompress (e.g., expand, etc.) to begin the decoupling process of the body frame member 200 and the frame 300. The decompression of the springs 110 allows the hex nuts 124 to be lifted off of the top surface 42 of the retainer plate 40, as indicated by directional arrow 600.

Figure 7:
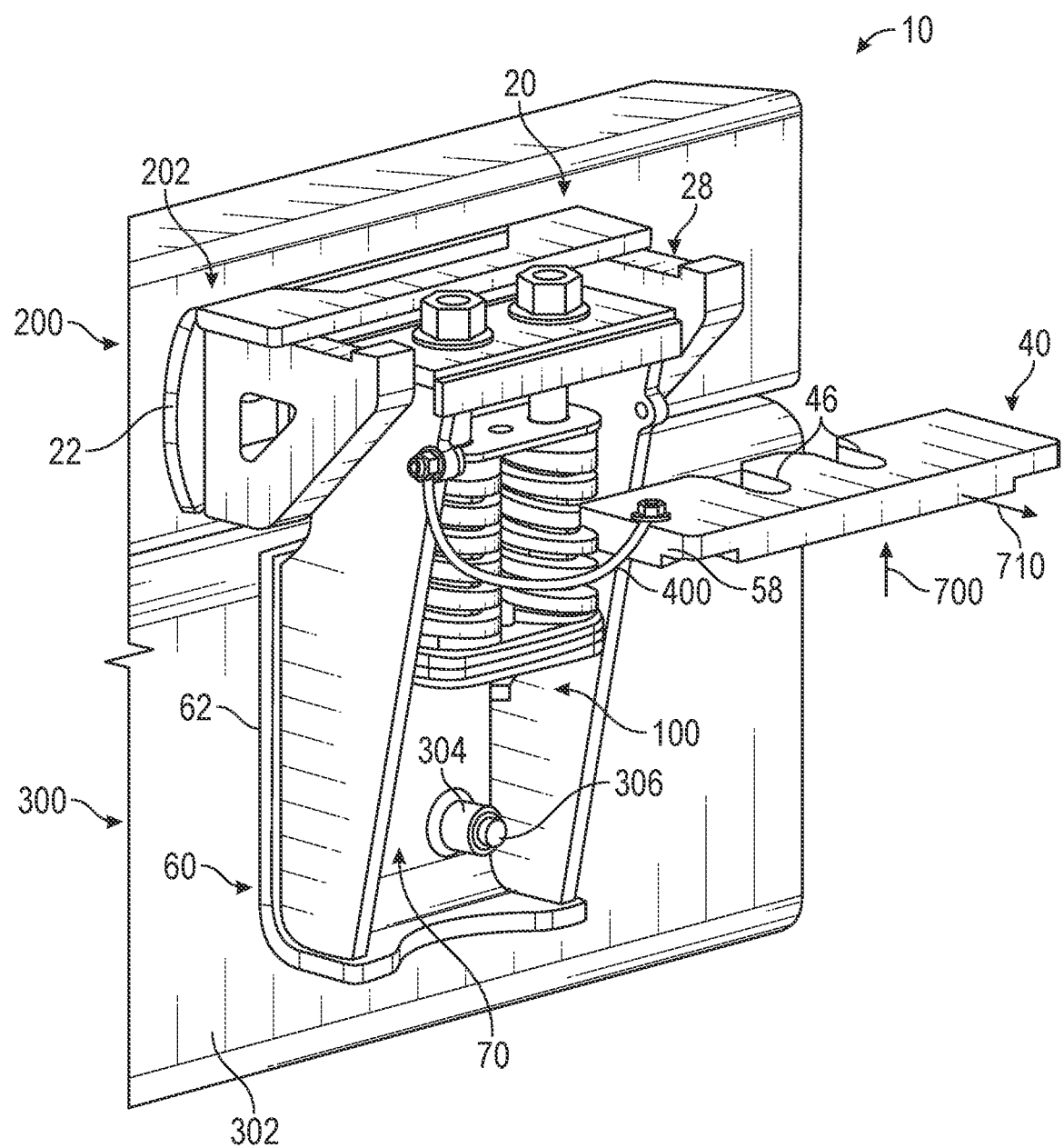
FIG. 7 is a perspective view of the body tie-down of FIG. 1 with a retainer plate removed, according to an exemplary embodiment.

As shown in FIG. 7, the retainer plate 40 may then be lifted upward as indicated by directional arrow 700 such that the extension 58 of the retainer plate 40 is removed from the slot 28 of the body guide 20. In turn, the retainer plate 40 may be pulled laterally away from the body guide 20 as indicated by directional arrow 710. The lateral movement of the retainer plate 40 is facilitated by the slots 46 having open ends. As shown in FIG. 7, the retainer plate 40 remains coupled to the frame guide 60 by the tether 400. The spring assembly 100 also remains coupled to the body guide by the hex nuts 124. By way of example, the hex nuts 124 may be completely loosened such that the spring assembly 100 may be removed from the cavity 70 of the frame guide 60 (e.g., to replace a component of the spring assembly 100, etc.).

Figure 8:
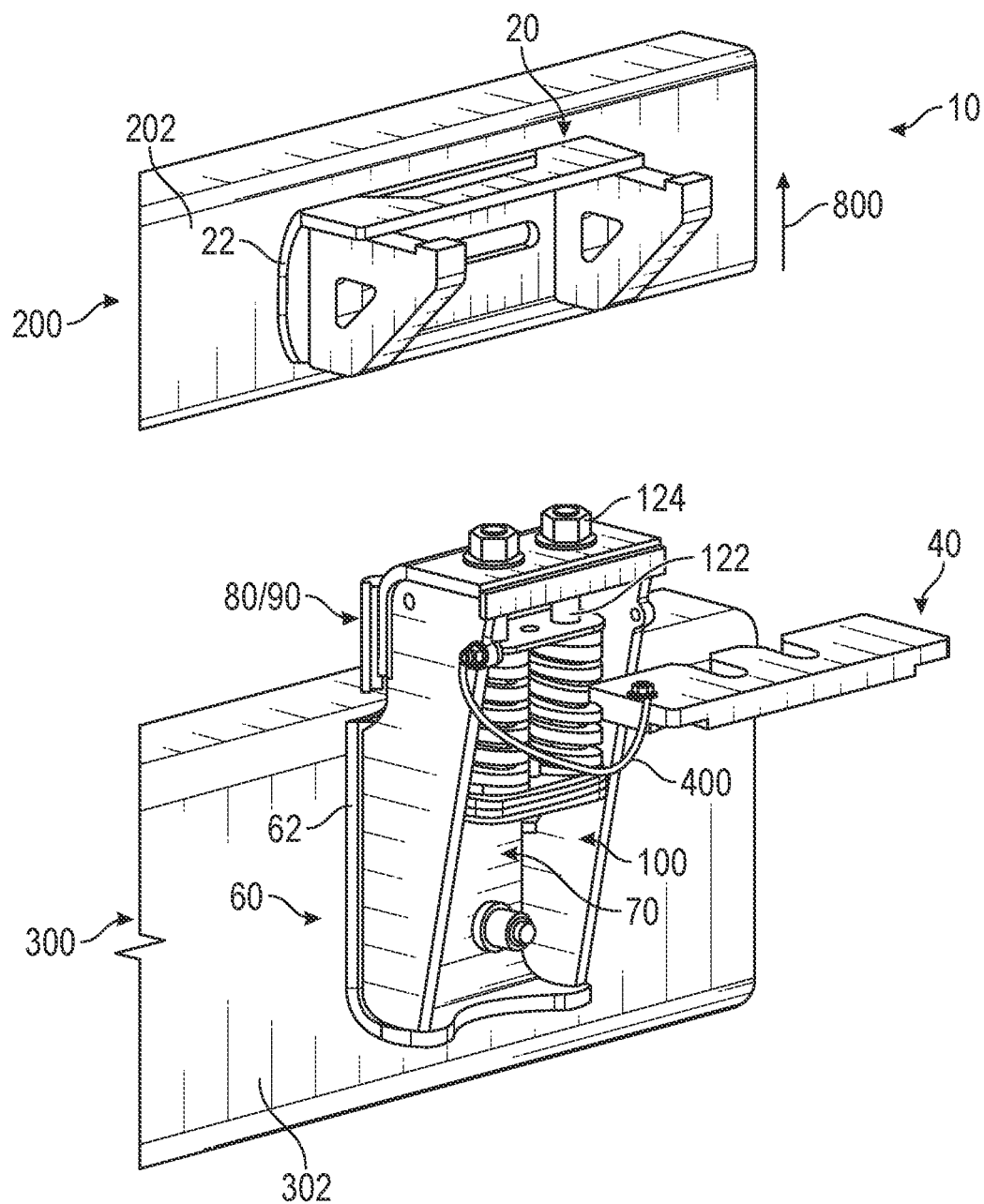
FIG. 8 is a perspective view of the body tie-down of FIG. 1 when the retainer plate is removed, allowing relative translation between a body frame member and a frame member, according to an exemplary embodiment.

As shown in FIG. 8, the body guide 20 is decoupled from the frame guide 60 as the retainer plate 40 is removed. Therefore, the body frame member 200 and the associated body of the vehicle may be detached from the frame 300 following the removal of the retainer plate 40, as indicated by directional arrow 800. As shown in FIG. 8, the wear plate 80 and the shim pack 90 remain coupled to the frame guide 60. According to an exemplary embodiment, the body tie-down 10 of the present disclosure improves the serviceability of a vehicle upon which the body tie-down 10 is installed. The serviceability is improved because only one tool is required to adjust the tension of the springs 110 and there are no loose components, thereby preventing the risk of potentially losing components of the body tie-down 10 as the body frame member 200 is decoupled from the frame 300.

Figure 9:
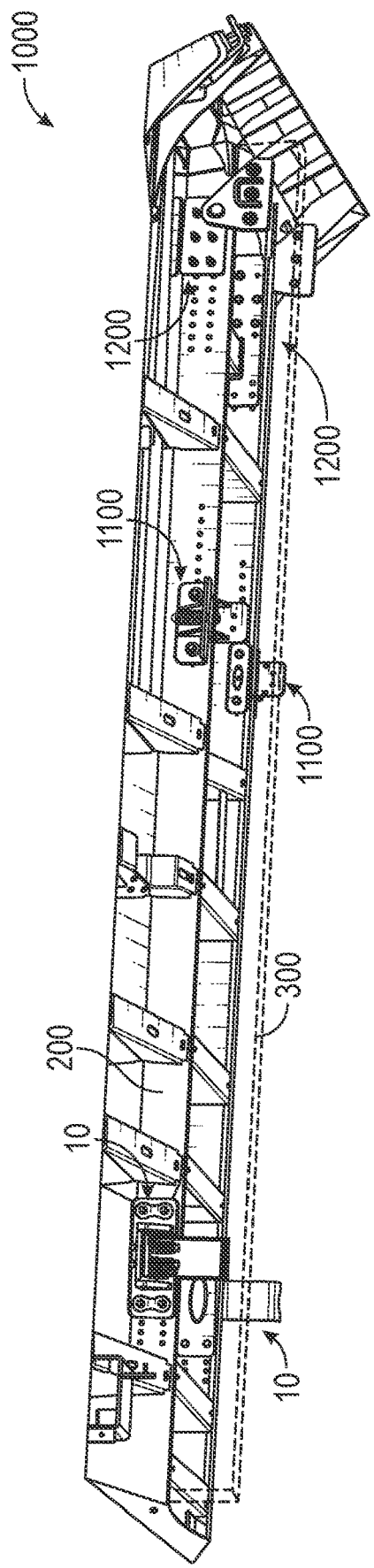
FIG. 9 is a perspective view of a chassis for a commercial vehicle including the body tie-down of FIG. 1, and additional second and third body tie-downs, according to an exemplary embodiment.

Referring now to FIG. 9, a chassis assembly 1000 can include the body tie-down 10 for coupling body frame 200 with frame 300. Chassis assembly 1000 can be a chassis assembly of any commercial vehicle such as a refuse vehicle, a concrete mixer vehicle, a fire truck, a mining vehicle, etc. Chassis assembly 1000 can be configured to couple body frame 200 with frame 300 through one or more resilient joints. For example, it may be possible to simply fasten body frame 200 with frame 300, but such a coupling may result in an undesirable hard joint therebetween. Advantageously, some amount of resilience in the joint may be desired. Chassis assembly 1000 includes the body tie-down 10, a second body tie-down 1100, and a third body tie-down 1200. As shown in FIG. 9, chassis assembly 1000 includes three body tie-downs (e.g., the body tie-down 10, the second body tie-down 1100, and the third body tie-down 1200) along each of opposite sides of the body frame member 200 and the frame 300.

The body tie-downs shown in FIG. 9 that couple the body frame member 200 with the frame 300 provide a semi-resilient joint between the body frame member 200 and the frame 300. Additionally, the body tie-downs shown in and described with reference to FIGS. 9-12 can be removably or adjustably coupled with the body frame member 200 and the frame 300.

Figure 10:
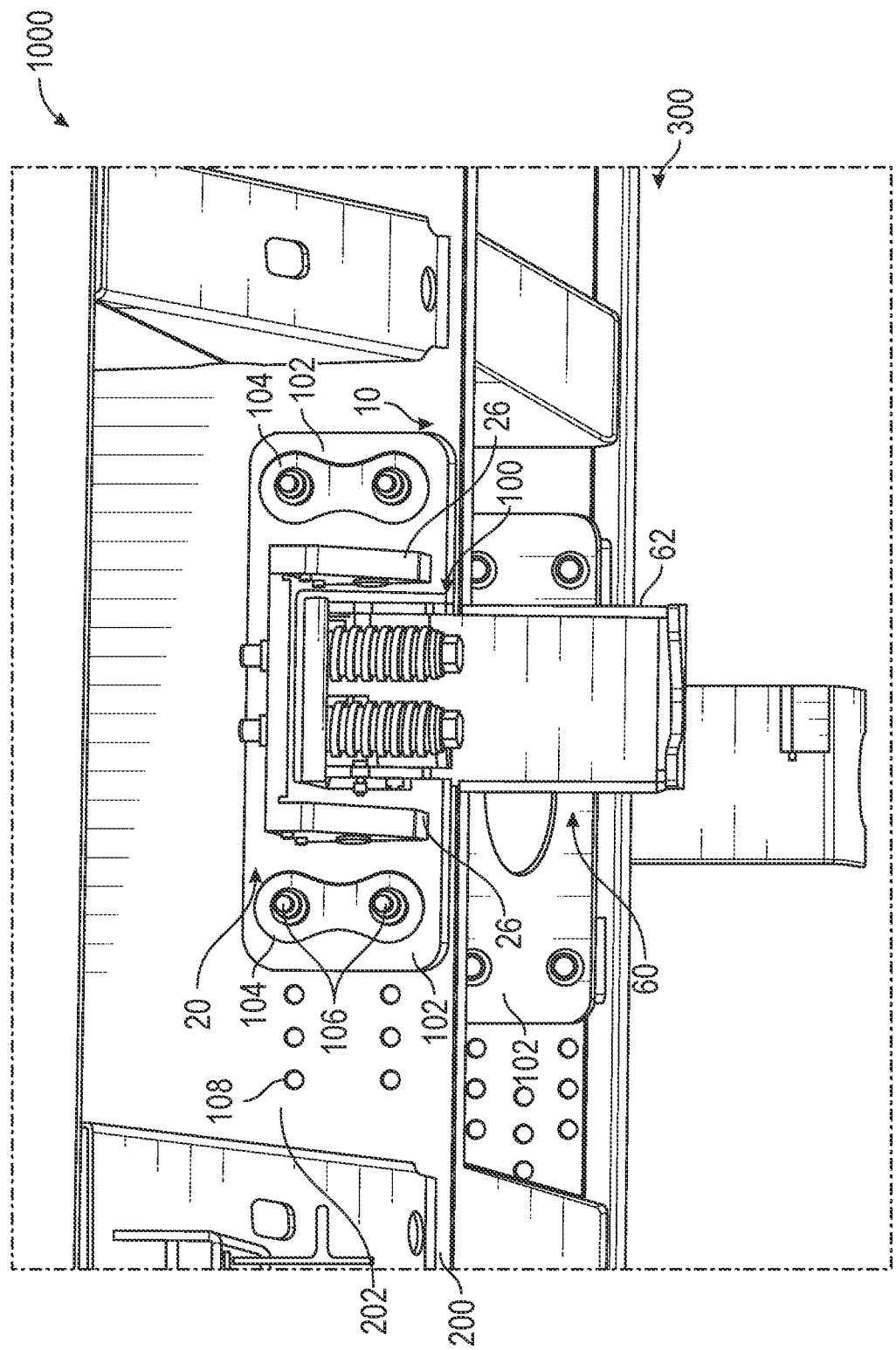
FIG. 10 is a perspective view of the body tie-down of the chassis of FIG. 9, according to an exemplary embodiment.

Referring particularly to FIG. 10, the body tie-down 10 is shown according to another embodiment. The body tie-down 10 as shown in FIG. 10 can be the same as or similar to the body tie-down as described in greater detail above with reference to FIGS. 1-8 but may include one or more modifications or additional components. The body tie-down 10 includes the spring assembly 100, the frame guide 60, and the body guide 20. The body tie-down 10 can also include the brackets 26, the retainer plate 40, the wear plate 80, and/or the shim pack 90.

Referring still to FIG. 10, the body tie-down 10 includes a mounting plate, a retaining plate, a coupling plate, a coupling member, an engagement member, etc., shown as mounting plate 102. The mounting plate 102 is positioned at the body mounting surface 202. The body mounting surface 202 includes a number of openings, holes, apertures, connection members, etc., shown as holes 108. The body mounting surface 202 includes two rows of the holes 108 that are equally spaced apart along the body mounting surface 202. Two mounting plates 102 are used, with one positioned on an exterior surface or face of the body frame member 200, and another positioned at an interior surface or face of the body frame member 200. The mounting plates 102 can both be positioned directly on either side of the body frame member 200 at a same position along body frame member 200. For example, the exterior mounting plate 102 may be aligned with the interior mounting plate 102. The mounting plate 102 (e.g., the exterior mounting plate) may be the body mounting portion 22.

The body tie-down 10 also includes a washer, a plate, etc., shown as coupling plate 104. Coupling plate 104 includes a pair of openings or apertures and can be configured to receive a pair of fasteners 106 therethrough. Fasteners 106 can include a bolt and a collar that are swaged together. The pair of openings or apertures may be spaced a distance apart that is substantially equal to the distance between the two rows of apertures 108. The two rows of apertures 108 can be configured to receive the pair of fasteners 106 therethrough. The coupling plate 104 can function as a washer or a load distribution plate. The coupling plate 104 may extend between both of the fasteners 1m06 to distribute a clamping force between the body mounting surface 202 and the mounting plate 102. The body tie-down 10 may include a pair of coupling plates 104, with a first coupling plate positioned at a first end of the body tie-down 10 and a second coupling plate positioned at a second end of the body tie-down 10.

The mounting plate 102 is configured to fixedly couple, attach, secure with, etc., the body guide 20. The mounting plate 102 may be fastened with the body guide 20 or integrally formed with the body guide 20. The brackets 26 can extend through openings, holes, apertures, windows, etc., of the mounting plate 102. The brackets 26 can be received within the openings and fixedly couple with the mounting plate 102.

The body tie-down 10 is adjustable or movable between a variety of positions. Specifically, the fasteners 106 that extend through a first coupling plate 104 and the fasteners 106 that extend through a second coupling plate 104 (positioned at an opposite end of the mounting plate 102) are configured to extend through the apertures 108 and through corresponding openings or apertures in the interior mounting plate. The frame mounting portion 62 is configured to attach, secure, or fixedly couple with the frame 300. In this way, the body tie-down 10 may be de-coupled from the body mounting surface 202, moved to a different set of holes 108, and coupled at a different position along the body mounting surface 202 with different holes 108.

Figure 11:
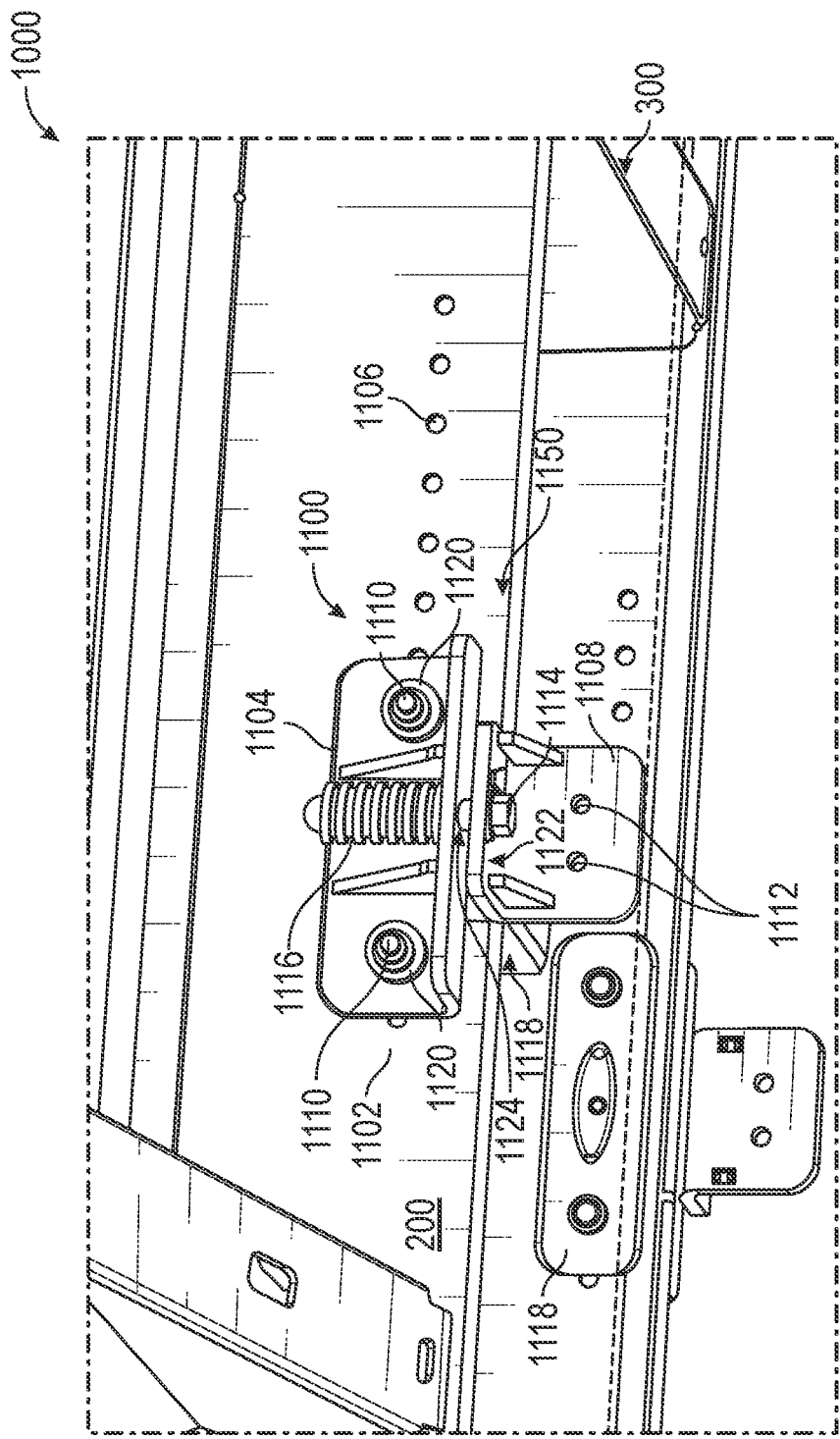
FIG. 11 is a perspective view of the second body tie-down of the chassis of FIG. 9, according to an exemplary embodiment.

Referring now to FIG. 11, the second body tie-down 1100 is shown, according to an exemplary embodiment. The second body tie-down 1100 is similar to or the same as body tie-down 10 and may share one or more similar or common features with the body tie-down 10. The second body tie-down includes a mounting plate, a mounting member, etc., shown as first body mounting member 1104. The first body mounting member 1104 can have a general L-shape or a bracket shape with a pair of orthogonal plate members. The first body mounting member 1104 is configured to fixedly couple with the body frame member 200 at body mounting surface 1102. The body mounting surface 1102 includes one or more rows of holes, openings, bores, apertures, etc., shown as openings 1106. Openings 1106 extend through an entire thickness of the body frame member 200.

The openings 1106 are configured to receive fasteners 1110 therethrough. Fasteners 1110 extend through corresponding openings 1106 and through the first body mounting member 1104. The second body tie-down 1100 can include a pair of two fasteners 1110, with each of the two fasteners 1110 being positioned at opposite ends of the body mounting member 1104. The second body tie-down 1100 also includes collars 1120 at each of the fasteners 1110. Fasteners 1110 can include a bolt and a collar that are swaged together.

A second body mounting member 1118 can be positioned on an opposite side of the body frame member 200. The first body mounting member 1104 and the second body mounting member 1118 can be aligned with each other on either side of the body frame member 200. The second body mounting member 1118 can be similar to the first body mounting member 1104 and may be a planar member that includes openings or apertures to receive the fasteners 1110 therethrough. The first body mounting member 1104 and the second body mounting member 1118 sandwich the body frame member 200 therebetween, with the fasteners 1110 extending through the first body mounting member 1104, the second body mounting member 1118, and the body frame member 200. The fasteners 1110 clamp the first body member 1104 and the second body member 1118 with the body frame member 200 to provide a rigid or stiff joint.

The second body tie-down 1100 also includes a spring assembly 1150 that is configured to provide a semi-resilient joint between the body frame member 200 and the frame 300. The spring assembly 1150 also functions to couple or connect the first body mounting member 1104 and a frame mounting member 1108. Frame mounting member 1108 can be the same as or similar to the first body mounting member 1104, having a general bracket or L-shape. Frame mounting member 1108 includes a first portion (e.g., a planar portion) and a second portion (e.g., a planar portion) that are orthogonal or perpendicular with each other. Frame mounting member 1108 can include an opening 1122 through which a central fastener 1114 extends. The opening 1122 of frame mounting member 1108 is aligned with a corresponding opening 1124 of the first body mounting member 1104 so that the central fastener 1114 can extend through both the opening 1122 and the opening 1124. The fastener 1114 extends through the opening 1122 and the opening 1124 and may extend beyond the opening 1124 along the first body mounting member 1104.

The spring assembly 1150 also includes a spring 1116. The spring 1116 may be a compression spring that, when compressed, exerts an expansive force between the first body mounting member 1104 and an end of the fastener 1114 which is transferred to a compressive force between the first body mounting member 1104 and the frame mounting member 1108. In this way, the spring 1116, or more generally, the spring assembly 1150 may provide a semi-resilient coupling between the body frame member 200 and the frame 300. The fastener 1114 includes a first end that couples with or engages the frame mounting member 1108 and a second end that can be configured to engage, abut, contact, etc., an end of the fastener 1114. The fastener 1114 extends through a central opening or inner volume of the spring 1116. The fastener 1114 may extend in a direction that is substantially perpendicular with or orthogonal to the pair of two fasteners 1110.

The frame mounting member 1108 also includes one or more openings, apertures, holes, bores, etc., shown as openings 1112. The openings 1112 are configured to receive one or more fasteners to fixedly couple the frame mounting member 1108 with the frame 300. FIG. 11 shows two openings 1112 but any number of openings may be used. In other embodiments, the frame mounting member 1108 is integrally formed, riveted, or otherwise attached to the frame 300. The frame mounting member 1108 couples with the first body mounting member 1104 through the spring assembly 1150 so that a semi-resilient joint is formed therebetween.

As shown in FIG. 11, the body mounting surface 1102 includes multiple openings 1106 so that the first body mounting member 1104 and the second body mounting member 1118 can be adjusted between different positions. Each position is associated with a pair of the openings 1106. In this way, the openings 1106 facilitate adjustment of the first body mounting member 1104 and the second body mounting member 1118 between various predetermined positions.

Advantageously, the joint provided by the spring assembly 1150 provides a semi-resilient coupling between the body frame member 200 and the frame 300. The semi-resilient coupling can allow an amount of translation (e.g., relative translation along a direction of the fastener 1114) between the body frame member 200 and the frame 300.

Figure 12:
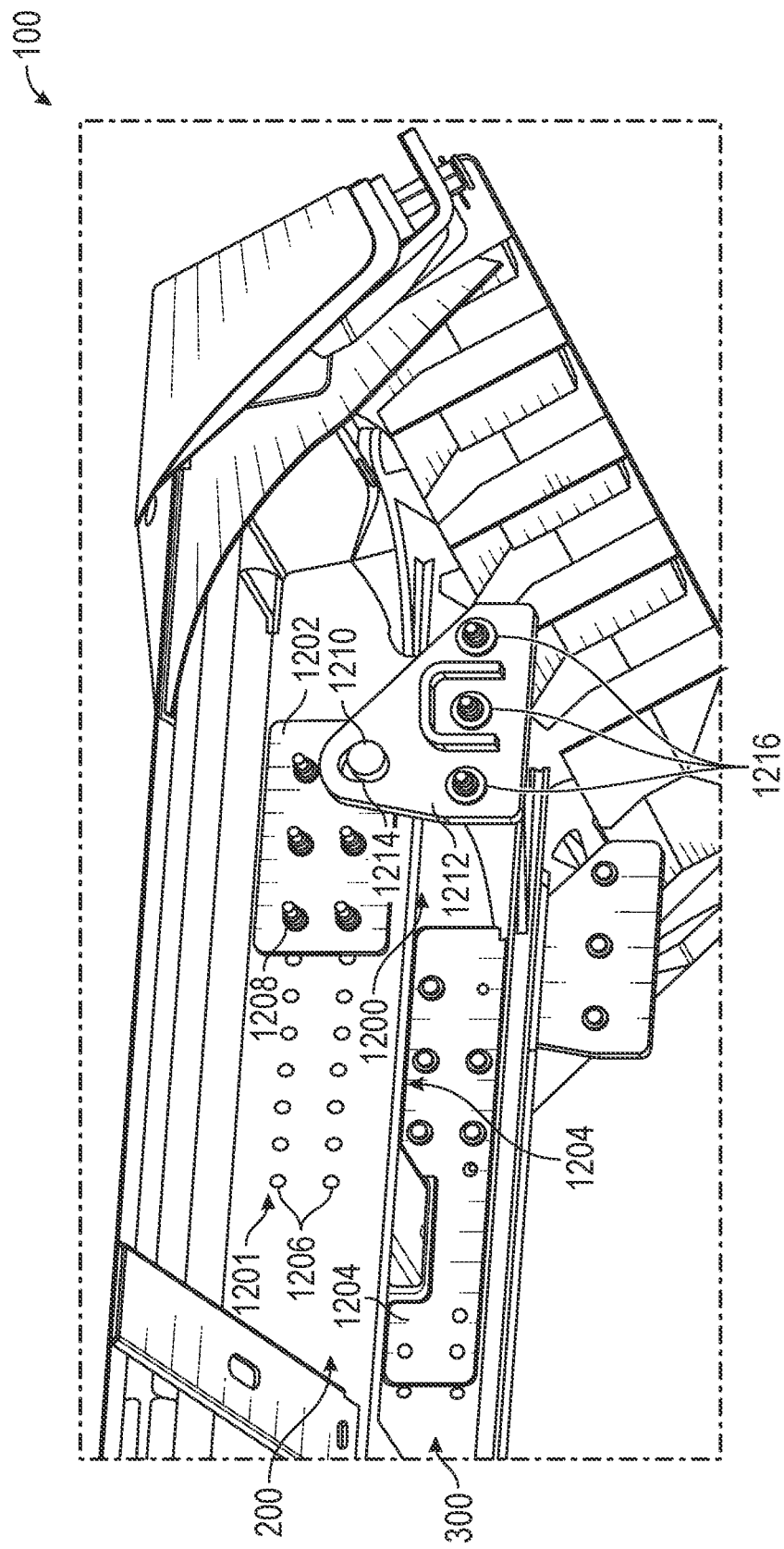
FIG. 12 is a perspective view of the third body tie-down of the chassis of FIG. 9, according to an exemplary embodiment.

Referring now to FIG. 12, the third body tie-down 1200 is shown, according to an exemplary embodiment. The third body tie-down 1200 may be a rear end tie-down that is positioned at a rear end of the body frame member 200 or a rear end of the frame 300. The third body tie-down 1200 can facilitate rotation or translation of the body frame member 200 relative to the frame 300 in a limited amount.

The third body tie-down 1200 includes a first body frame coupler 1202 and a second body frame coupler 1204. The first body frame coupler 1202 and the second body frame coupler 1204 can be positioned on opposite sides of the body frame member 200 (e.g., on an interior side and an exterior side of the body frame member 200). The first body frame coupler 1202 and the second body frame coupler 1204 can be planar or plate members that are positioned on either side of the body frame member 200. The first body frame coupler 1202 and the second body frame coupler 1204 are configured to couple with (e.g., fixedly), attach, or secure with the body frame member 200. The first body frame coupler 1202 and the second body frame coupler 1204 can be adjustable and/or removably coupled with the body frame member 200. For example, the body frame member 200 can include a body mounting surface 1201 having one or more openings, holes, apertures, bores, through-holes, etc., shown as apertures 1206. The body mounting surface 1201 can include two rows of apertures 1206 that are evenly spaced apart.

The first body frame coupler 1202 and the second body coupler 1204 can be coupled with the body mounting surface 1201 through fasteners 1208. The first body frame coupler 1202 and the second body frame coupler 1204 are coupled with five fasteners as shown in FIG. 12. In other embodiments, the first body frame coupler 1202 and the second body frame coupler 1204 are coupled with more or less than five fasteners. Each of the fasteners can extend through an opening or aperture of the first body frame coupler 1202, a corresponding one of the apertures 1206, and a corresponding opening, hole, or bore of the second body frame coupler 1204.

The first body frame coupler 1202 may be an exterior or outwards facing member. The first body frame coupler 1202 also includes a protrusion, an extension, an engagement member, etc., shown as protrusion 1210. Protrusion 1210 can have a circular shape and may extend a distance outwards from the first body frame coupler 1202.

Referring still to FIG. 12, the third body tie-down 1200 includes an engagement member, a coupling member, a frame coupling member, etc., shown as frame coupler 1212. The frame coupler 1212 can be a generally planar or flat member that is positioned proximate an exterior surface of the first body frame coupler 1202. The frame coupler 1212 can have a generally triangular shape. The frame coupler 1212 includes an opening, an aperture, a slot, a channel, a groove, a recess, etc., shown as slot 1214 that is configured to receive the protrusion 1210 of the first body frame coupler 1202. The slot 1214 may have adequate space to allow protrusion 1210 to translate relative to the frame coupler 1212 by some amount. The frame coupler 1212 also includes multiple fasteners 1216 that are configured to couple with the frame 300. The fasteners 1216 can include a bolt and a collar that are swaged together.

Referring again to FIGS. 9-12, it should be understood that the chassis assembly 1000 can include a pair of the body tie-down 10, a pair of the second body tie-down 1100, and a pair of the third body tie-down 1200. In this way, six tie-downs are used to couple the frame 300 with the body frame member 200. The third body tie-downs 1200 may be rear pivot members. Advantageously, the body tie-downs 10, the second body tie-downs 1100, and the third body tie-downs 1200 can use fasteners each including a bolt and a collar that are swaged together, which facilitates component level paint coverage and better corrosion protection. The fasteners can also provide a better connection quality than welds and may be less operator-dependent in the installation process than welding.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A body tie-down for a chassis comprising:
  a mounting plate configured to fixedly couple with a body frame member with a first plurality of fasteners, each of the first plurality of fasteners comprising a bolt and a collar that are swaged together;
  a spring assembly comprising a compression spring and an intermediate fastener that extends through the compression spring, the intermediate fastener that extends through the compression spring extending in a direction perpendicular with the first plurality of fasteners;
  a rigid member configured to couple with the mounting plate through the spring assembly to provide a semi-resilient joint between the rigid member and the mounting plate, the rigid member configured to fixedly couple with a frame of the chassis through a second plurality of fasteners, the second plurality of fasteners parallel with the first plurality of fasteners; and
  a retainer plate configured to selectively couple and decouple the mounting plate with the rigid member;
  wherein the spring assembly is configured to bias the body frame member into direct engagement with the chassis.

2. The body tie-down of claim 1, wherein the mounting plate and the rigid member are configured to couple with each other through the intermediate fastener and the compression spring so that relative translation of the mounting plate relative to the rigid member drives compression or extension of the compression spring.

3. The body tie-down of claim 1, wherein the first plurality of fasteners comprises two fasteners, wherein the mounting plate is fixedly coupled with the body frame member through the two fasteners and a coupling plate, wherein both of the two fasteners extend through the coupling plate and the coupling plate abuts the mounting plate.

4. The body tie-down of claim 1, wherein the mounting plate fixedly couples with the body frame member at a mounting surface.

5. The body tie-down of claim 4, wherein the mounting surface comprises a plurality of apertures for receiving the first plurality of fasteners, the plurality of apertures defining different positions for the mounting plate along the body frame member.

6. The body tie-down of claim 1, wherein the body tie-down for the chassis provides a joint between the chassis and the body frame member, the joint having some amount of resilience to allow dampened relative movement between the chassis and the body frame member.

7. The body tie-down of claim 1, wherein the chassis is a chassis of a refuse vehicle.

8. A vehicle comprising:
  a body;
  a chassis configured to couple with the body; and
  a plurality of body couplers, wherein a first one of the plurality of body couplers comprises:
    a mounting plate configured to fixedly couple with the body through a first plurality of fasteners, each of the first plurality of fasteners comprising a bolt and a collar that are swaged together;
    a spring assembly comprising a compression spring and an intermediate fastener that extends through the compression spring, the intermediate fastener that extends through the compression spring extending in a direction perpendicular with the first plurality of fasteners;
    a rigid member configured to couple with the mounting plate through the spring assembly to provide a semi-resilient joint between the rigid member and the mounting plate, the rigid member configured to fixedly couple with the chassis through a second plurality of fasteners, the second plurality of fasteners parallel with the first plurality of fasteners; and
    a retainer plate configured to selectively couple and decouple the mounting plate with the rigid member;
    wherein the spring assembly is configured to bias the body into direct engagement with the chassis.

9. The vehicle of claim 8, wherein, the mounting plate and the rigid member are configured to couple with each other through the intermediate fastener and the compression spring so that relative translation of the mounting plate relative to the rigid member drives compression or extension of the compression spring.

10. The vehicle of claim 8, wherein the first plurality of fasteners comprises two fasteners, wherein the mounting plate is fixedly coupled with the body through the two fasteners and a coupling plate, wherein both of the two fasteners extend through the coupling plate and the coupling plate abuts the mounting plate.

11. The vehicle of claim 8, wherein the mounting plate fixedly couples with the body at a mounting surface.

12. The vehicle of claim 11, wherein the mounting surface comprises a plurality of apertures for receiving the first plurality of fasteners, the plurality of apertures defining different positions for the mounting plate along the body.

13. The vehicle of claim 8, wherein the first one of the plurality of body couplers for the chassis provides a joint between the chassis and the body, the joint having some amount of resilience to allow dampened relative movement between the chassis and the body.

14. The vehicle of claim 8, wherein the vehicle is a refuse vehicle.

15. The vehicle of claim 8, wherein the plurality of body couplers are spaced apart along the chassis.

16. The vehicle of claim 8, wherein a second one of the plurality of body couplers comprises:
a first body frame coupler fastened with the body, the first body frame coupler comprising a protrusion; and
a second body frame coupler fastened with the chassis, the second body frame coupler comprising a slot within which the protrusion is received.

17. A chassis assembly for a refuse vehicle comprising:
a frame member;
a body; and
a coupler configured to secure the frame member with the body, the coupler comprising:
a mounting plate configured to fixedly couple with the body through a first plurality of fasteners, each of the first plurality of fasteners comprising a bolt and a collar that are swaged together;
a spring assembly comprising a compression spring and an intermediate fastener that extends through the compression spring, the intermediate fastener that extends through the compression spring extending in a direction perpendicular with the first plurality of fasteners; and
a rigid member configured to couple with the mounting plate through the spring assembly to provide a semi-resilient joint between the rigid member and the mounting plate, the rigid member configured to fixedly couple with the frame member through a second plurality of fasteners, the second plurality of fasteners parallel with the first plurality of fasteners; and
a retainer plate configured to selectively couple and decouple the mounting plate with the rigid member;
wherein the spring assembly is configured to bias the body into direct engagement with the frame member.

18. The chassis assembly of claim 17, wherein the mounting plate and the rigid member are configured to couple with each other through the intermediate fastener and the compression spring so that relative translation of the mounting plate relative to the rigid member drives compression or extension of the compression spring.

19. The chassis assembly of claim 17, wherein the first plurality of fasteners comprises two fasteners, wherein the mounting plate is fixedly coupled with the body through the two fasteners and a coupling plate, wherein both of the two fasteners extend through the coupling plate and the coupling plate abuts the mounting plate.

20. The chassis assembly of claim 17, wherein the coupler for the chassis assembly provides a joint between the frame member and the body, the joint having some amount of resilience to allow dampened relative movement between the frame member and the body.

* * * * *